US011277192B2

(12) United States Patent
Yan et al.

(10) Patent No.: US 11,277,192 B2
(45) Date of Patent: Mar. 15, 2022

(54) UPLINK TIMING COMPENSATION

(71) Applicant: QUALCOMM Incorporated, San Diego, CA (US)

(72) Inventors: Hongbo Yan, Vista, CA (US); Raghu Narayan Challa, San Diego, CA (US); Guy Wolf, Rosh Haayin (IL); Michael Levitsky, Rehovot (IL); Ran Berliner, Kfar-Aviv (IL); Awlok Singh Josan, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/669,017

(22) Filed: Oct. 30, 2019

(65) Prior Publication Data
US 2020/0145084 A1 May 7, 2020

Related U.S. Application Data

(60) Provisional application No. 62/754,496, filed on Nov. 1, 2018.

(51) Int. Cl.
*H04B 7/06* (2006.01)
*H04B 17/309* (2015.01)
(Continued)

(52) U.S. Cl.
CPC .......... *H04B 7/0695* (2013.01); *H04B 7/0413* (2013.01); *H04B 7/0617* (2013.01);
(Continued)

(58) Field of Classification Search
CPC .......... H04W 74/0833; H04W 56/0055; H04W 56/004; H04W 56/0045; H04W 56/005; H04B 7/0695; H04B 7/0617
See application file for complete search history.

(56) References Cited

U.S. PATENT DOCUMENTS

| | | | | |
|---|---|---|---|---|
| 2012/0014371 A1* | 1/2012 | Weng | ............... | H04J 3/0682 |
| | | | | 370/350 |
| 2013/0182683 A1* | 7/2013 | Seol | ............... | H04B 7/0695 |
| | | | | 370/335 |

(Continued)

FOREIGN PATENT DOCUMENTS

| | | | | |
|---|---|---|---|---|
| WO | WO-2018143846 A1 * | 8/2018 | ............ | H04L 5/005 |
| WO | WO-2020041757 A1 * | 2/2020 | ........... | H04L 5/0023 |

OTHER PUBLICATIONS

R2-1801044, Uplink TA maintenance with multi-beam operation, 3GPP TSG-RAN2 Meeting #AH-1801, Huawei, HiSilicon, Vancouver, Canada, Jan. 22-26, 2018 (Year: 2018).*

(Continued)

*Primary Examiner* — Aristocratis Fotakis
(74) *Attorney, Agent, or Firm* — Muncy, Geissler, Olds & Lowe, P.C.

(57) ABSTRACT

A user equipment (UE) may monitor multiple beam pair links (BPLs) including a first BPL currently used by the UE to communicate with a network node (e.g., a base station), and a second BPL. The first BPL comprises a first network beam and a first UE beam, and the second BPL comprises a second network beam and a second UE beam. The UE may decide to switch beams from using the first BPL to using the second BPL based on signaling from the network node or autonomously. When the beam switch is made, the UE switches uplink (UL) transmission from over the first UE beam to over the second UE beam. After the beam switch is made, the UE transmits in the UL over the second UE beam using UL timing adjusted based on the first and second propagation delays.

26 Claims, 11 Drawing Sheets

(51) Int. Cl.
    *H04W 56/00*     (2009.01)
    *H04W 72/12*     (2009.01)
    *H04W 74/08*     (2009.01)
    *H04B 7/0413*     (2017.01)

(52) U.S. Cl.
    CPC ......... *H04B 7/0632* (2013.01); *H04B 17/309* (2015.01); *H04W 56/0045* (2013.01); *H04W 56/0055* (2013.01); *H04W 72/1268* (2013.01); *H04W 74/0833* (2013.01)

(56) References Cited

U.S. PATENT DOCUMENTS

| | | | | |
|---|---|---|---|---|
| 2013/0201911 | A1* | 8/2013 | Bergstrom | H04L 5/0053 370/328 |
| 2013/0301619 | A1* | 11/2013 | Singh | H04W 56/0045 370/336 |
| 2014/0016620 | A1* | 1/2014 | Singh | H04L 5/0078 370/336 |
| 2015/0009984 | A1* | 1/2015 | Jung | H04W 56/0055 370/350 |
| 2016/0192306 | A1* | 6/2016 | Ma | H04W 56/00 370/350 |
| 2017/0302355 | A1* | 10/2017 | Islam | H04W 74/0833 |
| 2018/0219717 | A1* | 8/2018 | Lee | H04W 56/0065 |
| 2019/0319686 | A1* | 10/2019 | Chen, IV | H04W 72/046 |
| 2020/0412512 | A1* | 12/2020 | Wu | H04L 5/001 |

OTHER PUBLICATIONS

International Search Report and Written Opinion—PCT/US2019/059159—ISA/EPO—dated Mar. 17, 2020.
Partial International Search Report—PCT/US2019/059159—ISA/EPO—dated Jan. 23, 2020.

* cited by examiner

UPLINK TIMING COMPENSATION

CROSS-REFERENCE TO RELATED APPLICATION

The present Application for Patent claims the benefit of U.S. Provisional Patent Application No. 62/754,496 entitled "UPLINK TIMING COMPENSATION," filed Nov. 1, 2018, assigned to the assignee hereof, and expressly incorporated herein by reference in its entirety.

TECHNICAL FIELD

Various aspects described herein generally relate to wireless communication systems, and more particularly, to uplink timing compensation.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, in general, the propagation loss increases by 20 dB for every order of magnitude increase in frequency such that propagation loss for a 24 GHz or 50 GHz band is 20 dB greater relative to that observed for the 2.4 GHz or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both.

Traditionally, when a transmitter broadcasts an RF signal, it broadcasts the RF signal in many directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

Where a transmitter uses beamforming to transmit RF signals, the beams of interest for data communication between the transmitter and receiver are often the beams carrying RF signals having the highest received signal strength (or highest received Signal to Noise plus Interference Ratio (SINK), for example, in the presence of a directional interfering signal).

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect is directed to a method of a user equipment (UE). The method may comprise monitoring a first beam pair link (BPL) and monitoring a second BPL. The UE may currently be in communication with a network node over the first BPL. The first BPL may comprise a first network beam and a first UE beam, and the second BPL may comprise a second network beam and a second UE beam. The first BPL may be monitored to determine a first link quality metric and a first propagation delay of the first BPL, and the second BPL may be monitored to determine a second link quality metric and a second propagation delay of the second BPL. The UE may receive a first downlink (DL) reference signal from the network node over the first network beam, and may receive a second DL reference signal from the network node over the second network beam. The UE may determine the first propagation delay by tracking a time of arrival of the first DL reference signal over the first network beam, and may determine the second propagation delay by tracking a time of arrival of the second DL reference signal over the second network beam. The method may also comprise determining, autonomously or based on signaling from the network node, whether a beam switch should be made. When it is determined that the beam switch should be made, the method may comprise beam switching from the first BPL to the second BPL to communicate with the network node such that the UE switches uplink (UL) transmission from over the first UE beam to over the second UE beam. The method may further comprise transmitting, after the beam switch is made, in the UL over the second UE beam using UL timing adjusted based on the first link quality metric, second link quality metric, first propagation delay, second propagation delay, or any combination thereof.

An aspect is directed to a user equipment (UE) comprising a memory, a transceiver, and a processor coupled to the memory and the transceiver. The processor, the memory, and/or the transceiver may be configured to monitor a first beam pair link (BPL) and monitor a second BPL. The UE may currently be in communication with a network node over the first BPL. The first BPL may comprise a first network beam and a first UE beam, and the second BPL may comprise a second network beam and a second UE beam. The first BPL may be monitored to determine a first link quality metric and a first propagation delay of the first BPL, and the second BPL may be monitored to determine a second link quality metric and a second propagation delay of the second BPL. The UE may receive a first downlink (DL) reference signal from the network node over the first network beam, and may receive a second DL reference signal from the network node over the second network beam. The UE may determine the first propagation delay by tracking a time of arrival of the first DL reference signal over the first network beam, and may determine the second propagation delay by tracking a time of arrival of the second DL reference signal over the second network beam. The processor, the memory, and/or the transceiver may also be configured to determine, autonomously or based on signaling from the network node, whether a beam switch should be made. When it is determined that the beam switch should be made, the processor, the memory, and/or the transceiver may be configured to beam switch from the first BPL to the second BPL to communicate with the network node such that the UE switches uplink (UL) transmission from over the first UE beam to over the second UE beam. The processor, the memory, and/or the transceiver may further be configured to transmit, after the beam switch is made, in the UL over the second UE beam using UL timing adjusted based on the first link quality metric, second link quality metric, first propagation delay, second propagation delay, or any combination thereof.

An aspect is directed to a user equipment (UE). The UE may comprise means for monitoring a first beam pair link (BPL) and means for monitoring a second BPL. The UE may currently be in communication with a network node over the first BPL. The first BPL may comprise a first network beam and a first UE beam, and the second BPL may comprise a second network beam and a second UE beam. The first BPL may be monitored to determine a first link quality metric and a first propagation delay of the first BPL, and the second BPL may be monitored to determine a second link quality metric and a second propagation delay of the second BPL. The UE may receive a first downlink (DL) reference signal from the network node over the first network beam, and may receive a second DL reference signal from the network node over the second network beam. The UE may determine the first propagation delay by tracking a time of arrival of the first DL reference signal over the first network beam, and may determine the second propagation delay by tracking a time of arrival of the second DL reference signal over the second network beam. The UE may also comprise means for determining, autonomously or based on signaling from the network node, whether a beam switch should be made. The UE may comprise means for beam switching such that when it is determined that the beam switch should be made, the means for beam switching may beam switch from the first BPL to the second BPL to communicate with the network node such that the UE switches uplink (UL) transmission from over the first UE beam to over the second UE beam. The UE may further comprise means for transmitting, after the beam switch is made, in the UL over the second UE beam using UL timing adjusted based on the first link quality metric, second link quality metric, first propagation delay, second propagation delay, or any combination thereof.

An aspect is directed to a non-transitory computer-readable medium storing computer-executable instructions for a user equipment (UE). The computer-executable instructions may comprise one or more instructions instructing the UE to monitor a first beam pair link (BPL) and monitor a second BPL. The UE may currently be in communication with a network node over the first BPL. The first BPL may comprise a first network beam and a first UE beam, and the second BPL may comprise a second network beam and a second UE beam. The first BPL may be monitored to determine a first link quality metric and a first propagation delay of the first BPL, and the second BPL may be monitored to determine a second link quality metric and a second propagation delay of the second BPL. The UE may receive a first downlink (DL) reference signal from the network node over the first network beam, and may receive a second DL reference signal from the network node over the second network beam. The UE may determine the first propagation delay by tracking a time of arrival of the first DL reference signal over the first network beam, and may determine the second propagation delay by tracking a time of arrival of the second DL reference signal over the second network beam. The computer-executable instructions may also comprise one or more instructions instructing the UE to determine, autonomously or based on signaling from the network node, whether a beam switch should be made. When it is determined that the beam switch should be made, the computer-executable instructions may comprise one or more instructions instructing the UE to beam switch from the first BPL to the second BPL to communicate with the network node such that the UE switches uplink (UL) transmission from over the first UE beam to over the second UE beam. The computer-executable instructions may further comprise one or more instructions instructing the UE to transmit, after the beam switch is made, in the UL over the second UE beam using UL timing adjusted based on the first link quality metric, second link quality metric, first propagation delay, second propagation delay, or any combination thereof.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
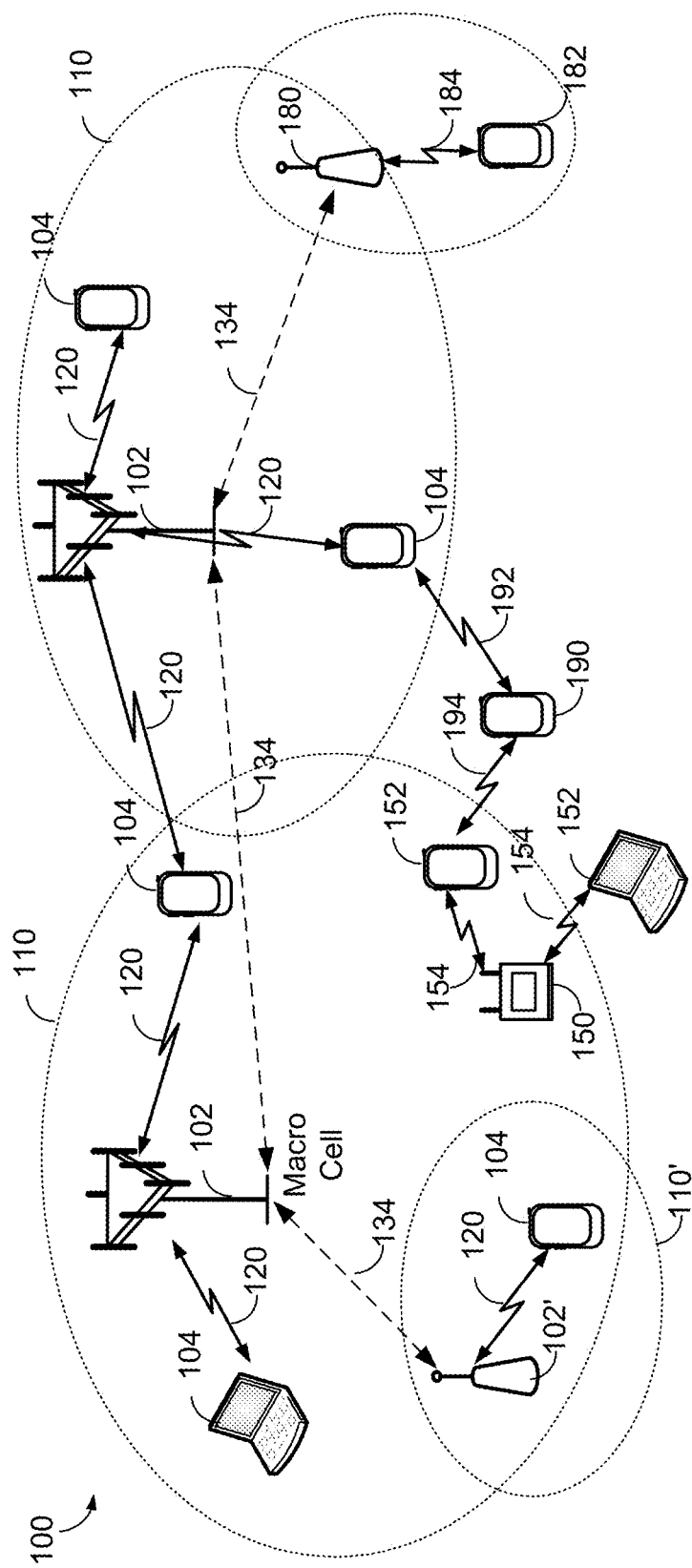
FIG. 1 illustrates an exemplary wireless communications system according to various aspects.

Various aspects described herein generally relate to wireless communication systems, and more particularly, to uplink (UL) transmission timing compensations when a beam switch occurs. These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would instructing an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
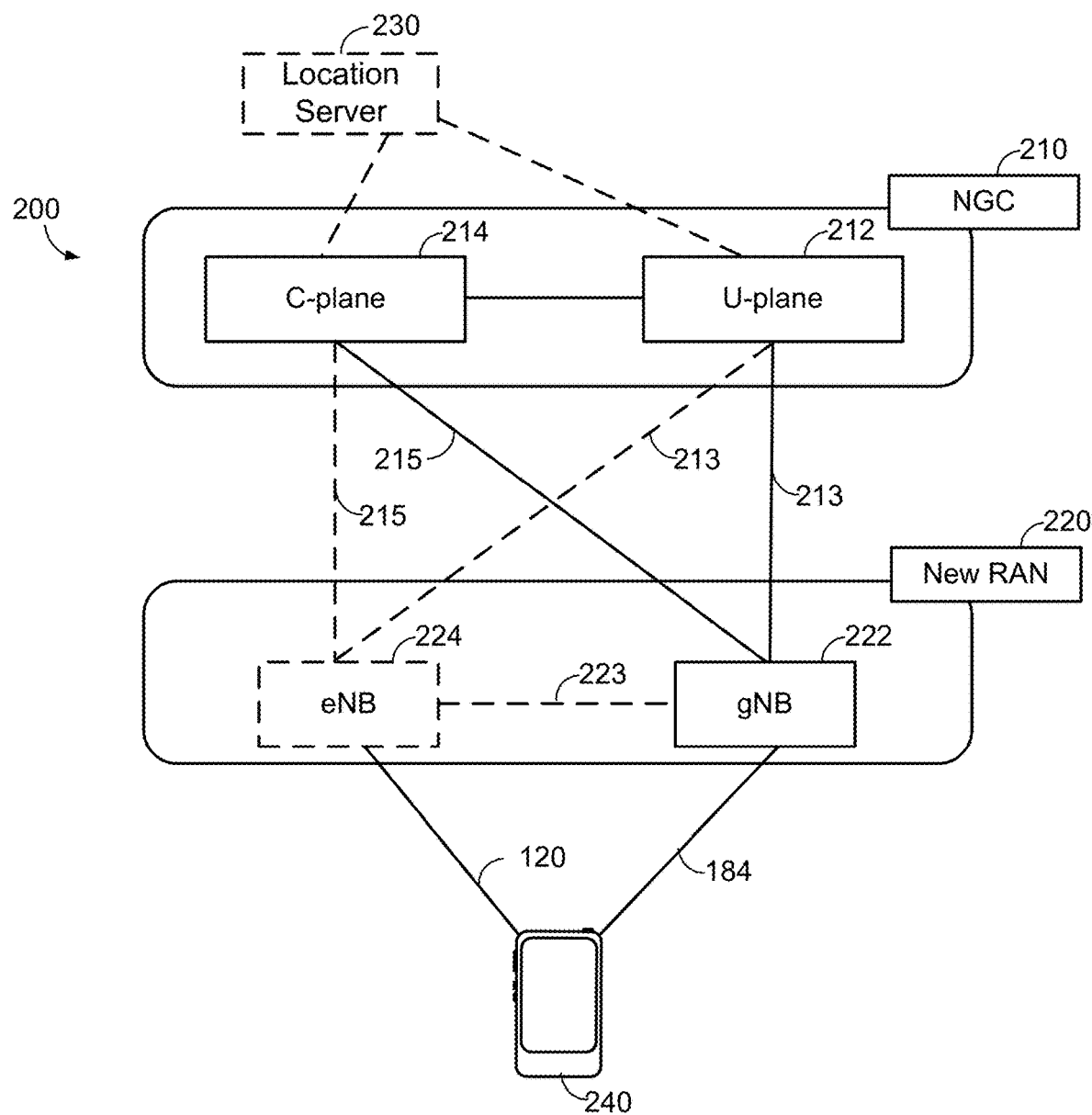
FIGS. 2A and 2B illustrate example wireless network structures according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, internet protocol (IP) routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
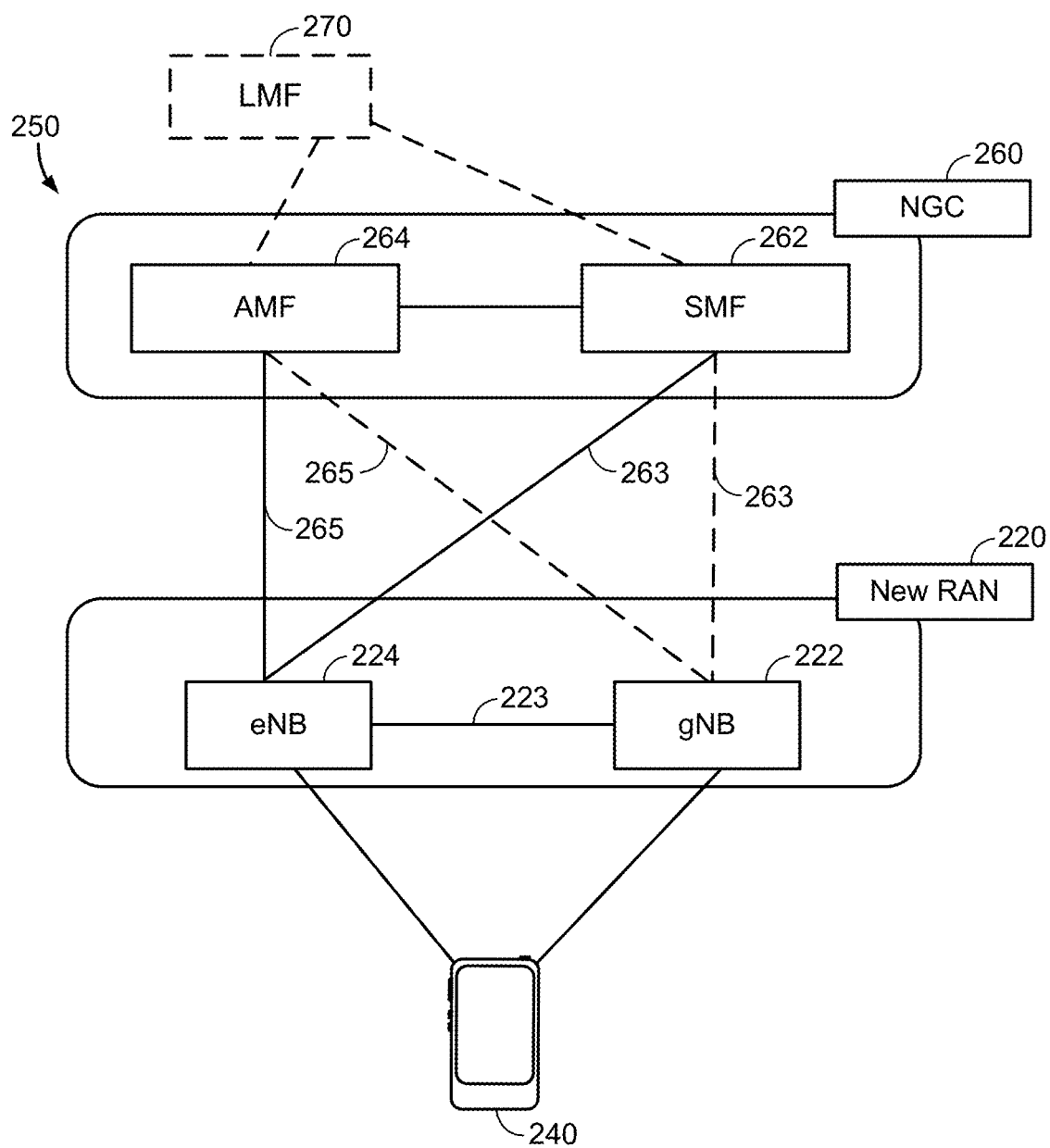

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 may connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
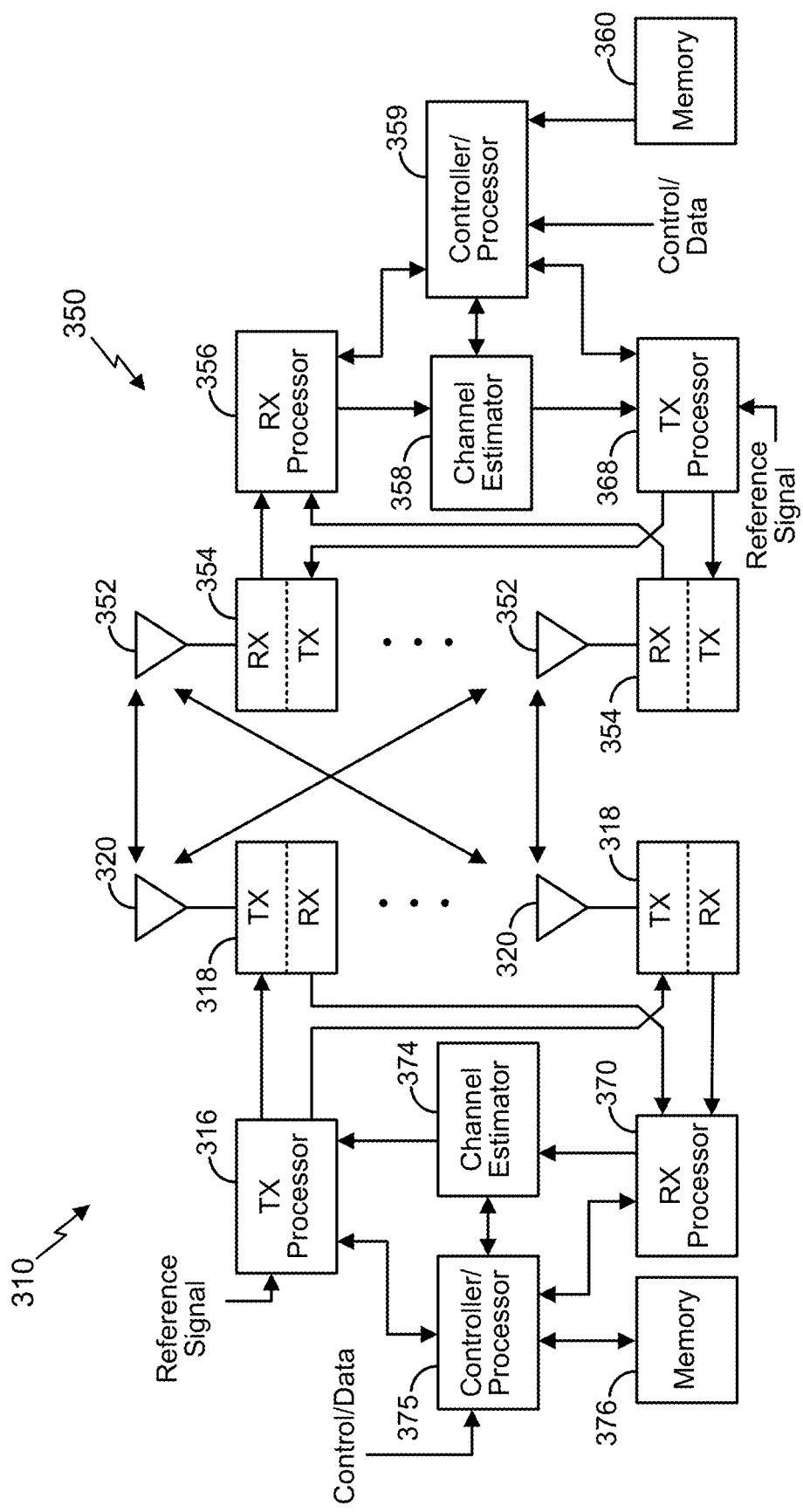
FIG. 3 illustrates an exemplary base station and an exemplary UE in an access network according to various aspects.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/NGC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4:
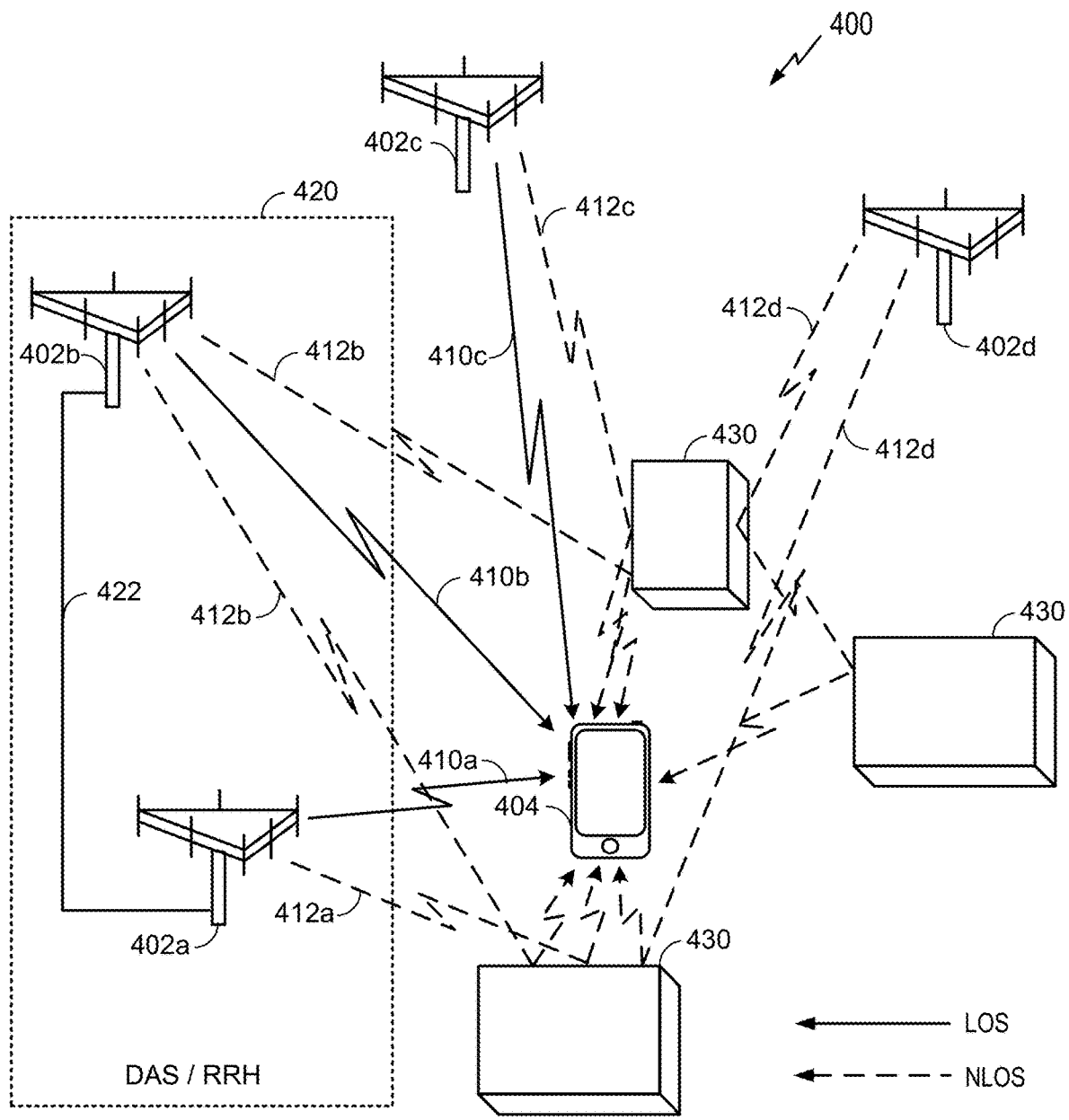
FIG. 4 illustrates an exemplary wireless communications system according to various aspects.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), can communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. While FIG. 4 illustrates one UE 404 and four base stations 402, as will be appreciated, there may be more UEs 404 and more or fewer base stations 402.

The base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., observed time difference of arrival (OT-DOA) or reference signal time difference (RSTD)) between pairs of network nodes and/or to identify the beam that best excite the LOS or shortest radio path between the UE 404 and the transmitting base stations 402.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of non-line-of-sight (NLOS) paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

Each LOS path 410 and NLOS path 412 represents the path followed by an RF signal. An "RF signal" comprises an electromagnetic wave that transports information through the space between the transmitter and the receiver. As illustrated in FIG. 4 and as described further below, the receiver (e.g., UE 404) may receive multiple "RF signals" corresponding to each transmitted RF signal due to the propagation characteristics of RF signals through multipath channels. More specifically, when a transmitter (e.g., a base station 402) transmits an RF signal, the RF signal received at the receiver (e.g., UE 404) is the sum or accumulation of the RF signals received over multiple paths. For example, the UE 404 may combine the RF signals received over the LOS path 410c and the NLOS path 412c into a single RF signal. Since signal paths may have different lengths and arrive at the receiver from different directions, as illustrated in FIG. 4, the RF signal from each path is accordingly delayed and arrives at a certain angle. This directional effect is more pronounced at higher frequencies, such as mmW.

In receive beamforming, the receiver uses a receive beam to amplify RF signals detected on a given channel. For example, the receiver can increase the gain setting and/or adjust the phase setting of an array of antennas (e.g., antennas 352 in FIG. 3) in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., RSRP, SINR, etc.) of the RF signals received from that direction.

Figure 5:
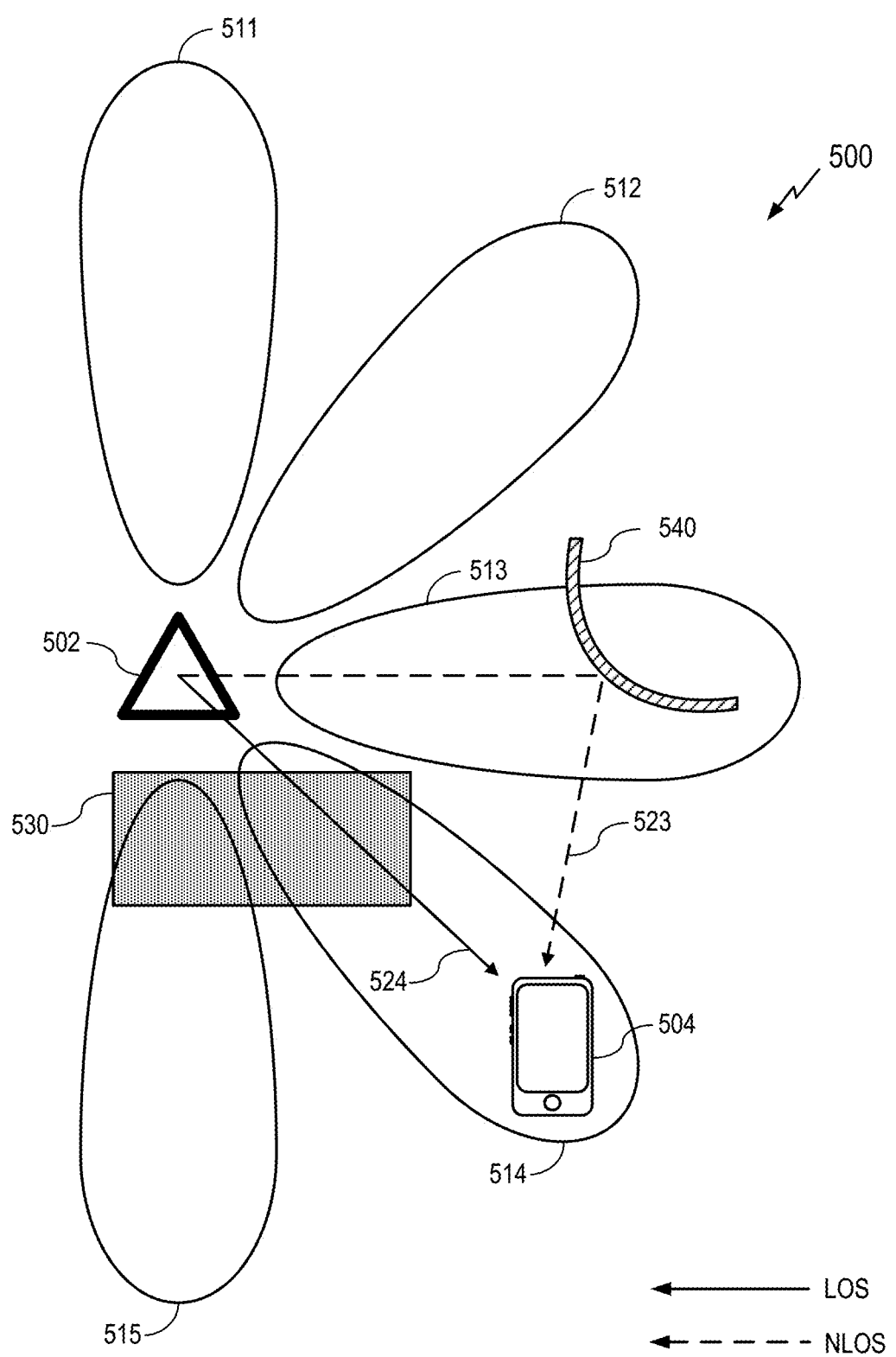
FIG. 5 illustrates an exemplary wireless communications system according to various aspects.

FIG. 5 illustrates an exemplary wireless communications system 500 according to various aspects of the disclosure. In the example of FIG. 5, a UE 504, which may correspond to UE 404 in FIG. 4, may communicate wirelessly with a base station 502, which may correspond to one of base stations 402 in FIG. 4, using RF signals and standardized protocols for the modulation of the RF signals and the exchange of information packets. As illustrated in FIG. 5, the base station 502 is utilizing beamforming to transmit a plurality of beams 511-515 of RF signals. Each beam 511-515 may be formed and transmitted by an array of antennas of the base station 502. Although FIG. 5 illustrates a base station 502 transmitting five beams, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 5, the UE 504 receives an NLOS stream 523 of RF signals transmitted on beam 513 and an LOS stream 524 of RF signals transmitted on beam 514. Although FIG. 5 illustrates the NLOS stream 523 and the LOS stream 524 as single lines (dashed and solid, respectively), as will be appreciated, the NLOS stream 523 and the LOS stream 524 may each comprise multiple rays (i.e., a "cluster") by the time they reach the UE 504 due, for example, to the propagation characteristics of RF signals through multipath channels. For example, a cluster of RF signals is formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS stream 523 is not originally directed at the UE 504, although, as will be appreciated, it could be, as are the RF signals on the NLOS paths 412 in FIG. 4. However, it is reflected off a reflector 540 (e.g., a building) and reaches the UE 504 without obstruction, and therefore, may still be a relatively strong RF signal. In contrast, the LOS stream 524 is directed at the UE 504 but passes through an obstruction 530 (e.g., vegetation, a building, a hill, a disruptive environment such as clouds or smoke, etc.), which may significantly degrade the RF signal. As will be appreciated, although the LOS stream 524 is weaker than the NLOS stream 523, the LOS stream 524 will arrive at the UE 504 before the NLOS stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP or SINR). Referring to FIG. 5, where the UE 504 is engaged in a data communication session with the base station 502 (e.g., where the base station 502 is the serving base station for the UE 504), the beam of interest for the data communication session may be the beam 513, as it is carrying the unobstructed NLOS stream 523.

Figure 6A:
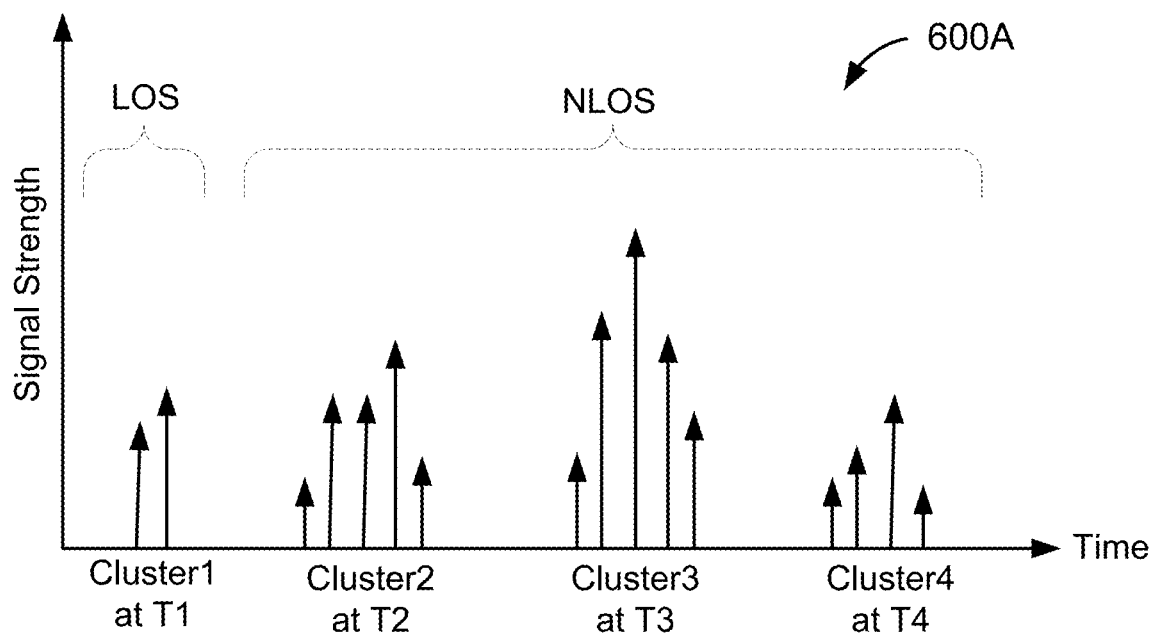
FIG. 6A is a graph showing the RF channel response at a UE over time according to various aspects.

FIG. 6A is a graph 600A showing the RF channel response at a receiver (e.g., UE 504) over time according to aspects of the disclosure. Under the channel illustrated in FIG. 6A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6A, because the first cluster of RF signals at time T1 arrives first, it is presumed to be the LOS stream (i.e., the stream arriving over the LOS or the shortest path), and may correspond to the LOS stream 524. The third cluster at time T3 is comprised of the strongest RF signals, and may correspond to the NLOS stream 523. Seen from the transmitter's side, each cluster of received RF signals may comprise the portion of an RF signal transmitted at a different angle, and thus each cluster may be said to have a different angle of departure (AoD) from the transmitter.

Figure 6B:
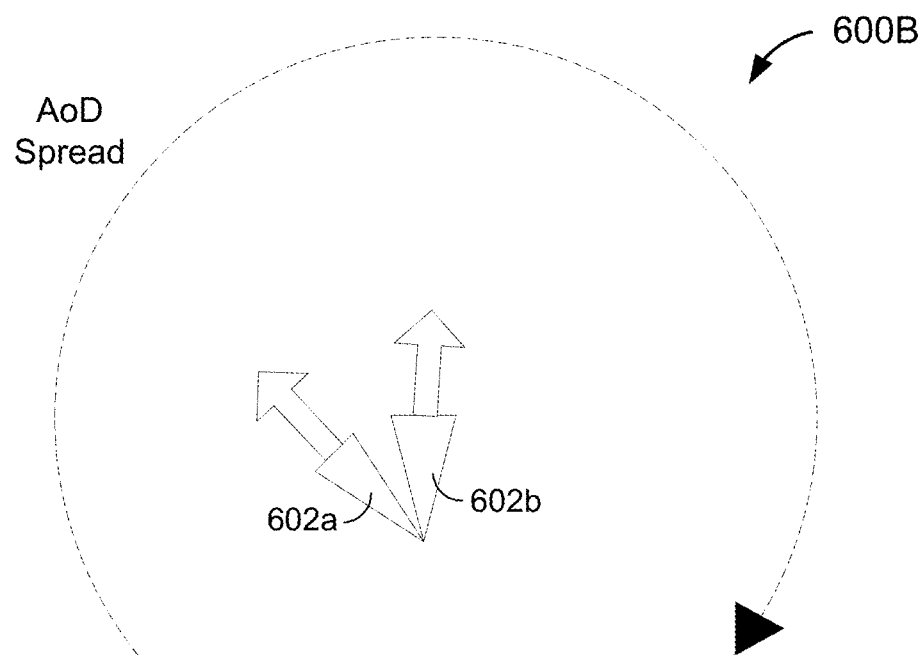
FIG. 6B illustrates an exemplary separation of clusters in angle of departure (AoD) according to various aspects.

FIG. 6B is a diagram 600B illustrating this separation of clusters in AoD. The RF signal transmitted in AoD range 602a may correspond to one cluster (e.g., "Cluster1") in FIG. 6A, and the RF signal transmitted in AoD range 602b may correspond to a different cluster (e.g., "Cluster3") in FIG. 6A. Note that although AoD ranges of the two clusters depicted in FIG. 6B are spatially isolated, AoD ranges of some clusters may also spatially partially overlap even though the clusters are separated in time. For example, this may arise when two separate buildings at same AoD from the transmitter reflect the signal towards the receiver. Note that although FIG. 6A illustrates clusters of two to five channel taps, as will be appreciated, the clusters may have more or fewer than the illustrated number of channel taps.

As in the example of FIG. 5, the base station 502 may utilize beamforming to transmit a plurality of beams of RF signals such that one of the beams (e.g., beam 514) is directed at the AoD range 602a of the first cluster of RF signals, and a different beam (e.g., beam 513) is directed at the AoD range 602b of the third cluster of RF signals. The signal strength of clusters in post-beamforming channel response (i.e., the channel response when the transmitted RF signal is beam formed instead of omni-directional) will be scaled by the beam gain along the AoD of the clusters. In that case, the beam of interest for data communications may be the beam directed at the AoD of the third cluster of RF signals, as they are the strongest.

In general, when transmitting an RF signal, the transmitter does not know what path it will follow to the receiver (e.g., UE 504) or at what time it will arrive at the receiver, and therefore transmits the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

A salient feature in 5g new radio (NR) is beam management. A gNB/UE beam pair links switch from one to the other to latch on the best link quality. There are two categories of beam switching. First is gNB directed beam switching based on UE reporting. Second is UE autonomous beam switching from UE receive (Rx) beam refinement or from handling maximum possible exposure (MPE). Beam switching can happen frequently in NR, especially for mmW. However, in contrast to handover (i.e., cell switching), a random access channel (RACH) procedure is not currently defined for UL timing re-alignment for beam switching within a same serving cell. To some extent, it is difficult to define such a use case for RACH because the UE may switch beam autonomously. Without UL timing compensation, gNB can lose track of UE transmissions to produce accurate timing advance (TA) values.

Figure 7A:
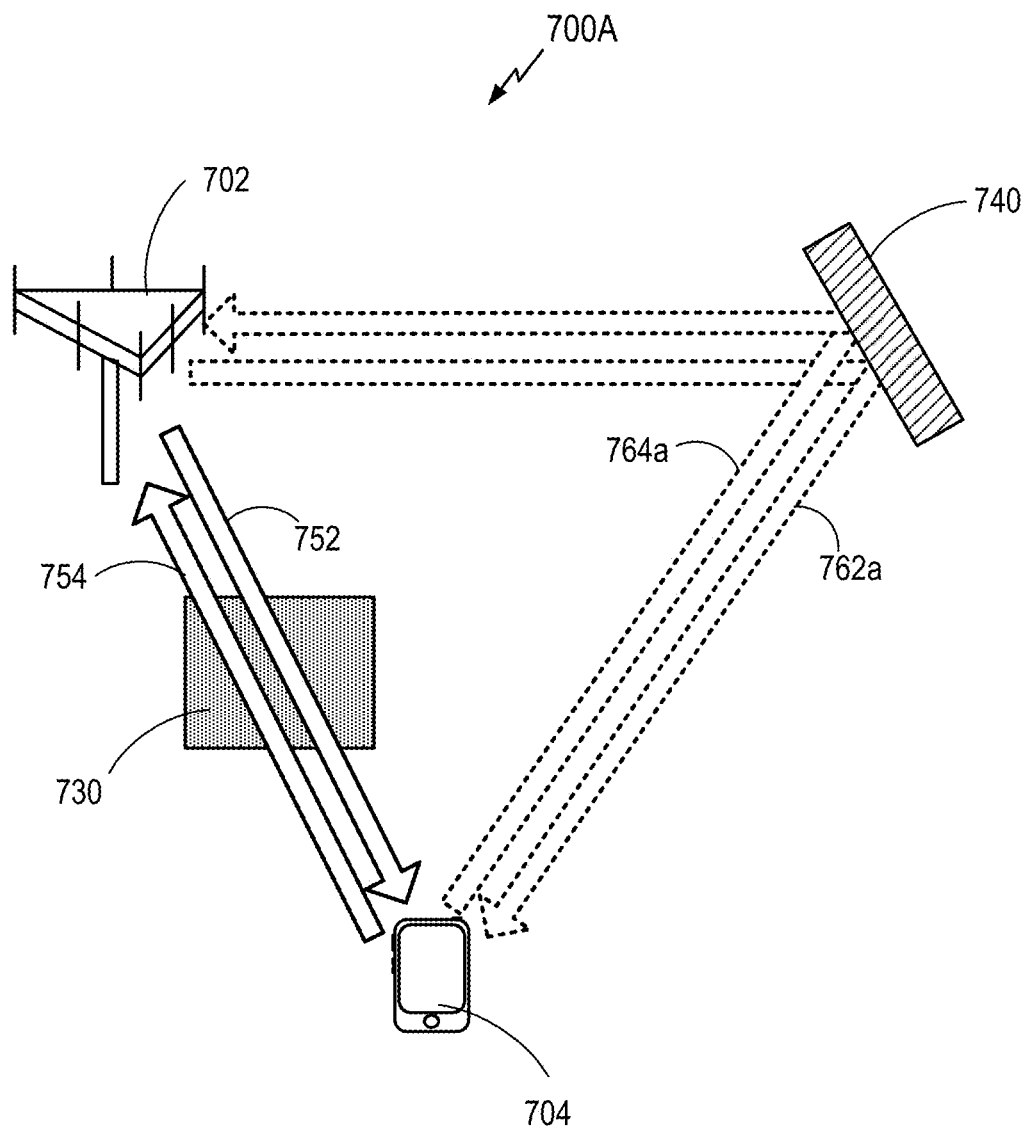
FIGS. 7A and 7B illustrate example beam switch scenarios according to various aspects.
Figure 7B:
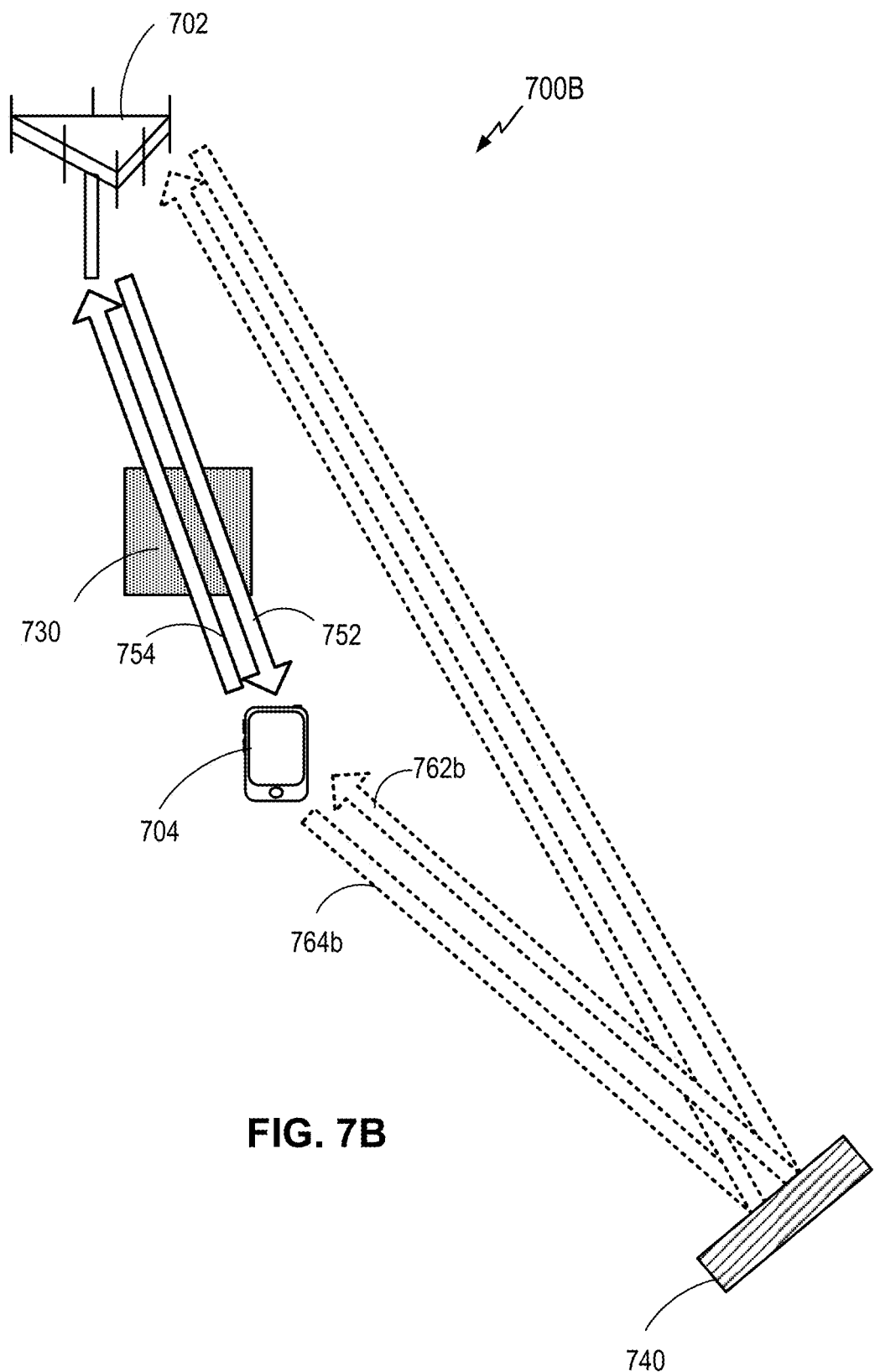

It has been observed in experiments that the propagation delay can change significantly due to beam switching. A UE may switch beams from a current beam to a target beam if the current beam becomes weak, e.g., due to an obstruction in the path of the current beam. FIGS. 7A, 7B illustrate example scenarios 700A, 700B in which beam switches may take place. In both FIGS. 7A, 7B, it may be assumed that the UE 704 is currently in communication with the base station 702 (e.g., gNB, gNodeB, etc.) over a first beam pair link (BPL), which comprises a first network beam 752 and a first UE beam 754. This means that when communicating with the base station 702, the UE 704 may receive DL data from the base station 702 over the first network beam 752 and may transmit in the UL over the first UE beam 754. The first BPL may be an LOS BPL.

While communicating with the base station 702, the UE 704 may monitor the first BPL (i.e., the current BPL) and also monitor one or more other BPLs such as a second BPL (i.e., the target BPL), which may comprise a second network beam 762a/762b and a second UE beam 764a/764b. For example, the UE 704 may monitor one or more downlink (DL) reference signals from the base station 702 transmitted over the first network beam 752, and may monitor one or more downlink (DL) reference signals from the base station 702 transmitted over the second network beam 762a/762b. For convenience, the DL reference signal(s) over the first network beam will be referred to as first DL reference signal(s), and the DL reference signal(s) over the second network beam will be referred to as second DL reference signal(s).

In both scenarios 700A, 700B, the second BPL (corresponding to 762a and 764a in scenario 700A, 762b and 764b in scenario 700B) is a reflected BPL, i.e., a non-LOS BPL. Due to the obstruction 730 in the path of the first BPL, the monitoring may indicate that the second BPL is better, in which case it can be determined (by the base station 702 and/or by the UE 704 autonomously) that a beam switch should take place to switch from the first BPL to the second BPL. When the beam switch takes place, the UE 704 may communicate with the base station 702 over the second BPL. In particular, the UE 704 may switch to transmit in the UL from over the first UE beam 754 to over the second UE beam 764a/764b. The UE 704 may or may not also switch to receive in the DL from over the first network beam 752 to over the second network beam 762a/762b.

One difference between FIGS. 7A, 7B is as follows. In FIG. 7A, the angles of the first BPL and second BPL at the base station 702 are significantly different, beyond the spread of any beam. This means that in FIG. 7A, the first and second BPLs may correspond to two different beams, e.g., correspond to beams with different beam indexes. On the other hand, in FIG. 7B, while the angles of the first BPL and second BPL at the base station 702 are also different, they are similar enough to be within the spread of one beam. This means that the second network beam 762b and the second UE beam 764b may be reflected versions of the first network beam 752 and the first UE beam 754.

In the scenario 700A of FIG. 7A, the beam switch may be initiated by the network, e.g., by the base station 702. From the reports of monitoring provided by the UE 704, the base station 702 may direct the UE 704 to switch beams. The base station 702 may choose to switch to the second BPL if the link quality of the second BPL is better than that of the first BPL. For example, the reports may indicate that the RSRP and/or SINR of the second BPL is higher than the RSRP and/or SINR of the first BPL. In an aspect, since there can be some cost to making the beam switch, the base station 702 may decide to make the beam switch when the second BPL's link quality is higher than the first BPL's link quality by a link quality difference threshold or more. Another reason for the base station 702 to switch beams may be perform load balancing among the UEs.

Alternatively, in the scenario 700A, the beam switch may be initiated by the UE 704 based on the monitoring. Similar to the base station 702, the UE 704 may initiate the beam switch if the second BPL's link quality is better than the first BPL's link quality. In a variation, the UE may decide to switch beams when the second BPL's link quality is higher than the first BPL's link quality by a link quality difference threshold (which may be same or different from the link quality difference threshold of the base station 702) or more to account for costs involved in actually making the switch. Another reason for the UE initiating the beam switch may be when there is a change in the transmission state, e.g., transmission configuration indication (TCI), at the base station 702. In the scenario 700A, whether initiated by the base station 702 or the UE 704, the switch may be in both directions, i.e., from over the first network beam 752 to over the second network beam 762a for the DL, and from over the first UE beam 754 to over the second UE beam 764a for the UL.

The scenario 700B of FIG. 7B represents a situation in which the beam switch may be autonomously performed by the UE 704. The base station 702 may be unaware of the switch performed by the UE 704 since the same resources (e.g., PUSCH, PDSCH, etc.) of the same beam are being used. In this scenario, the UE 704 may switch for transmitting in the UL over the first UE beam 754 to transmitting in the UL over the second UE beam 764b. However, the UE 704 may or may not switch for receiving in the DL. That is, the UE 704 may continue to receive in the DL over the first network beam 752 or may switch to receive in the DL over the second network beam 762b.

Regardless of the circumstances under which the beam switch takes place (scenarios 700A, 700B; base station or UE initiated), the UE 704 should adjust the UL timing when transmitting in the UL over the second UE beam 764a/764b. For convenience, "first link path" will be used to refer to the path of the first BPL between the base station 702 and the UE 704, and "second link path" will be used to refer to the path of the second BPL between the base station 702 and the UE 704. The first and second link paths have associated propagation delays. The UE 704 can determine or otherwise estimate the lengths of first and second paths by measuring the propagation delays of signals (e.g., reference signals) carried on the first network beam 752 and second network beam 762. The propagation delays may be determined by tracking time of arrivals (ToAs) of the signals over the first network beam 752 and second network beam 762a/762b.

In both scenarios 700A, 700B, the lengths of the first and second link paths are assumed to be different. Then after the beam switch is made, the UL timings should be adjusted when transmitting in the UL over the second UE beam 764a/764b so that the UL transmission arrives at the base station 702 aligned with other UL transmissions. For example, if the second link path is longer than the first link path, then the UL timings should be compensated for by advancing the UL timing (transmitted earlier) when transmitting in the UL over the second UE beam 764a/764b relative to the UL timings when the UL transmission was over the first UE beam 754. Conversely, if the second link path is shorter than the first link path, then the UL timings should be compensated for by delaying the UL timing (transmitted later) when transmitting in the UL over the second UE beam 764a/764b relative to the UL timings when the UL transmission was over the first UE beam 754.

Figure 8:
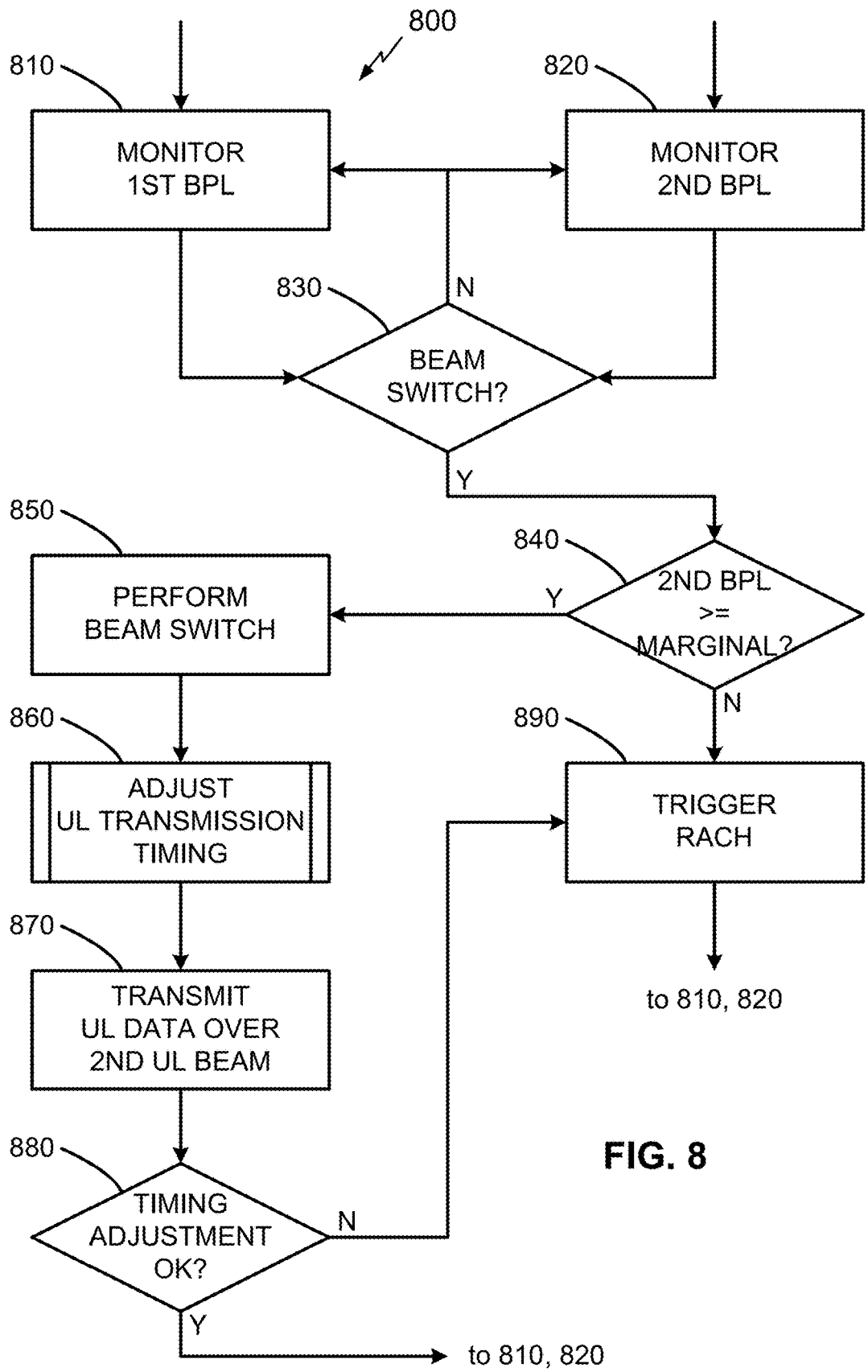
FIG. 8 illustrates a flow chart of an example method to perform uplink timing compensation according to various aspects.

FIG. 8 illustrates a flow chart of an example method 800 of operating a UE (e.g., UE 704, UE 350, etc.) to perform uplink transmission timing compensation. In an aspect, the memory 360 of the UE 350 in FIG. 3 may be an example of a computer-readable medium that stores computer executable instructions for one or more of the RX processor 356, the channel estimator 358, the controller/processor 359, and/or the TX processor 368 of the UE 350 to perform the method 800.

The UE may monitor a plurality of BPLs between a network node (e.g., the base station 702, base station 310) and the UE including first and second BPLs. For example, at block 810, the UE may monitor the first BPL, and at block 820, the UE may monitor the second BPL. Each BPL may comprise a network beam for DL communications and a UE beam for UL communications. For example, the first BPL may comprise a first network beam (e.g., first network beam 752) and a first UE beam (e.g., first UE beam 754), and the second BPL may comprise a second network beam (e.g., second network beam 762a/762b) and a second UE beam (e.g., second UE beam 764a/764b). The UE may currently be in communication with the network node over the first BPL, i.e., the UE may receive the DL data including one or more DL signals from the network node over the first network beam, and may transmit in the UL to the network node over the first UE beam.

The UE may monitor the plurality of BPLs to determine a plurality of link quality metrics corresponding to the plurality of BPLs. For each BPL, the link quality metric may be determined based on any combination of the following: signal-to-noise ratios (SNRs) of one or more downlink signals (e.g., DL reference signals), signal-to-interference-and-noise ratios (SINRs) of the one or more downlink signals, and reference signal received powers (RSRPs) of the one or more downlink signals. Thus, at block 810, the UE may monitor the first BPL to determine a first link quality metric, and at block 820, may monitor the second BPL to determine a second link quality metric.

The UE may also monitor the first BPL to determine a first propagation delay at block 810, and may monitor the second BPL to determine a second propagation delay at block 820. For example, the first propagation delay may be determined based on first time of arrival (ToA) of a reference signal from the network node to the UE over the first network beam, and a second ToA of a reference signal from the network node to the UE over the second network beam. Determining the first and second propagation delays can enable the availability of stored, periodically updated first propagation delay and second propagation delay for use when a beam switch is made or a determination to switch a beam is made without determining these delays at that time. However, the disclosed implementations can also include determinations of the first propagation delay and second propagation delay on demand at the time when a beam switch is made or a determination to switch a beam is made.

In an aspect, means to perform block 810 and/or means to perform block 820 may include one or more of the antenna 352, the transceiver 354, the RX processor 356, the channel estimator 358, the controller/processor 359, and/or the memory 360 of the UE 350 in FIG. 3.

Before proceeding further, the following should be noted. The method 800 indicates the first and second BPLs being monitored at blocks 810, 820 for ease of illustration. However, it is understood that the UE need not be limited to monitoring only two BPLs. As mentioned above, the UE may monitor a plurality of BPLs including the first and second BPLs. In other words, block 810 may be viewed as the UE monitoring the BPL currently being used for communication between the UE and the network node, and block 820 may be viewed as the UE monitoring at least one other BPL available for use.

At block 830, it may be determined whether or not the beam switch should be made. In one aspect, the network may decide to make the beam switch and the network node may provide signaling to that effect to the UE. The network node may decide to make the beam switch based on reports from the UE and the UE may be informed of the network node's decision at block 830. For example, the UE may report to the network node the first and second link quality metrics. When the reports indicate that the second link quality metric is higher than the first link quality metric (e.g., better RSRP, better SINR, etc.), the network node may inform (e.g., via a message or signaling) the UE to switch beams. As another example, the base station 702 may inform the UE to switch beams at block 830 to perform load balancing.

In another aspect, the UE can autonomously (i.e., on its own) determine to make the beam switch at block 830. For example, the UE may decide to make the beam switch when the second link quality metric is higher than the first link quality metric (e.g., second RSRP>first RSRP, second SINR>first SINR, etc.). In a variant, since there can be some cost to making the beam switch, in another aspect, the UE may decide to make the beam switch when the second link quality metric is higher than the first link quality metric by a link quality difference threshold (e.g., second RSRP>first RSRP+RSRP difference threshold, second SINR>first SINR+SINR difference threshold, etc.). The link quality difference threshold may be predetermined, determined based on a table, and/or dynamically determined to reflect penalties or costs associated with actually performing the beam switch. Another reason for the UE autonomously decide to perform the beam switch may be when there is a change in the transmission state, e.g., transmission configuration indication (TCI), at the network node.

In an aspect, means to perform block 830 may include one or more of the antenna 352, the transceiver 354, the RX processor 356, the channel estimator 358, the controller/processor 359, and/or the memory 360 of the UE 350 in FIG. 3.

When it is decided NOT to make the beam switch ("N" branch from block 830), the UE may proceed back to blocks 810, 820. Note that the second BPL being monitored at block 820 in subsequent iterations may or may not be the same second BPL monitored in previous iterations.

On the other hand, when it is decided to make the beam switch ("Y" branch from block 830), the UE may proceed to block 840 to determine whether the second link quality metric is at or above the marginal link quality threshold. In an aspect, means to perform block 840 may include one or more of the controller/processor 359, and/or the memory 360 of the UE 350 in FIG. 3.

The marginal link quality threshold may be predetermined, determined based on a table, and/or dynamically determined to reflect a likelihood of establishing a communication link of a minimum acceptable quality between the UE and the network node if the switch to the second BPL is made. In an aspect, the marginal link quality threshold may be set to reflect marginal levels set for any combination of SNR, SINR, and RSRP.

If the UE determines that the second link quality metric is below the marginal link quality threshold ("N" branch from block 840), then one option is to do nothing (not shown). In some scenarios, although a beam switch determination is made because the comparison between current beam (for example, first BPL) and target beam (for example, second BPL) suggests the target beam is superior in relative terms, but in absolute terms, the target beam may be below minimum acceptable quality level, i.e., may be marginal or below marginal. In such a case, nothing need be done and communication may continue on the current beam. Alternatively, at block 890, the UE may trigger a random access channel (RACH) procedure over the second UE beam. In an aspect, the RACH procedure triggered at block 890 can be the same RACH procedure to handle a handover of the UE.

Recall that when the method 800 is at block 840, the decision to beam switch has been made. However, if the second BPL is of questionable quality (as indicated by the second link quality metric), then there is likely to be a failure (beam and/or radio link). In this instance, instead of waiting for the failure, the UE may start the RACH process to establish communication with the network node over the second UE beam. The UE can then go back to blocks 810, 820 to monitor the BPLs. At this iteration, different BPLs may be monitored.

If the UE determines at block 840 that the second link quality metric is at or above the marginal link quality threshold ("Y" branch from block 840), the UE may proceed to block 850 to perform the beam switch. In other words, the UE may switch UL transmissions so that the UL transmissions are over the second UE beam from over the first UE beam. The UE may or may not switch the DL transmissions so that the DL data are received over the second network beam (if switch is made) or over the first network beam (if switch is not made).

In an aspect, means to perform block 850 may include one or more of the transceiver 354, the RX processor 356, the channel estimator 358, the controller/processor 359, the memory 360 and/or the TX processor 368 of the UE 350 in FIG. 3.

At block 860, the UE may adjust the UL timing based on the propagation delays. In an aspect, means to perform block 860 may include one or more of the transceiver 354, the controller/processor 359, the memory 360 and/or the TX processor 368 of the UE 350 in FIG. 3.

Figure 9:
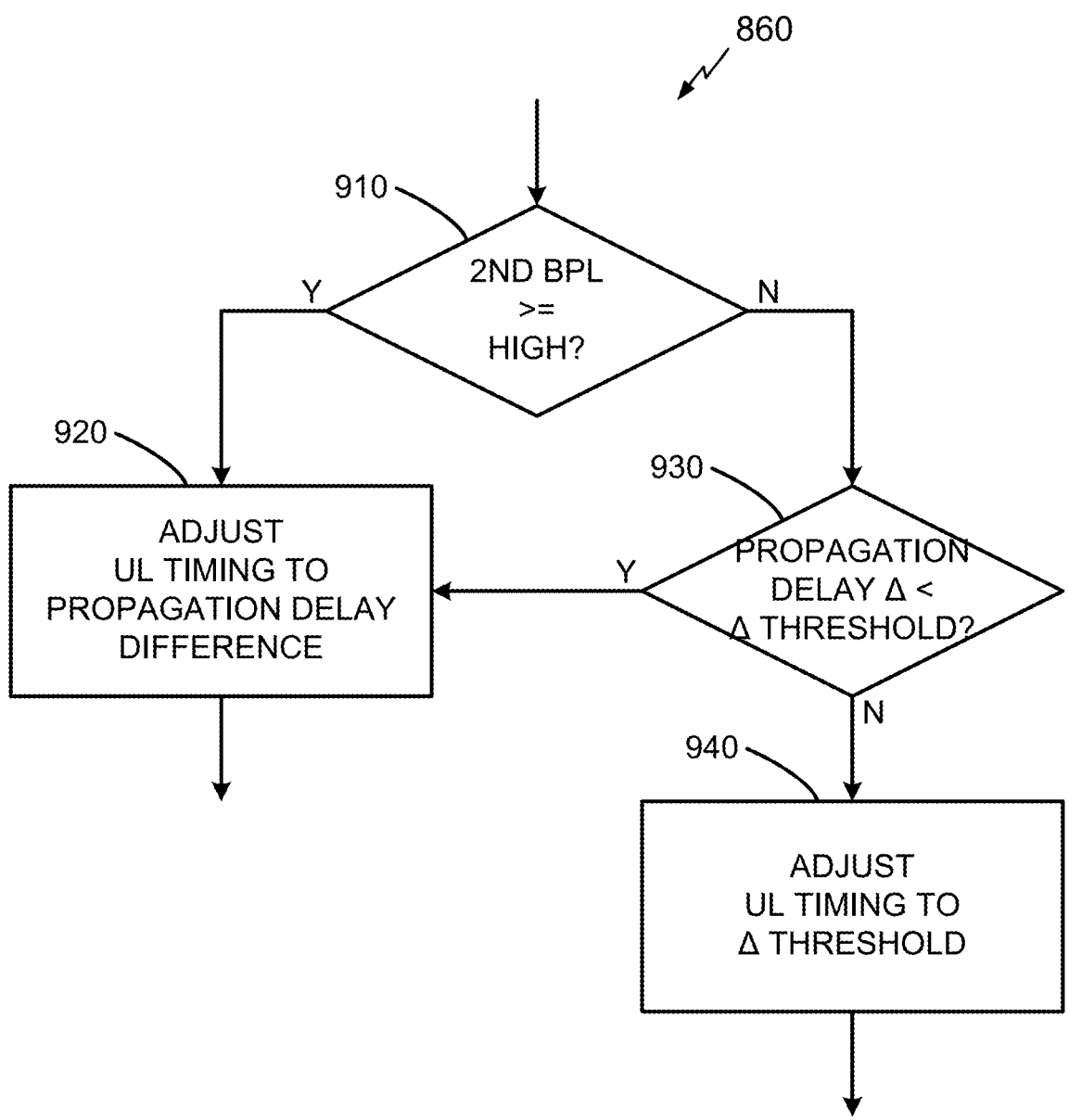
FIG. 9 illustrates an example process to adjust the uplink transmission timing according to various aspects.

FIG. 9 illustrates an example process the UE may perform to adjust the UL timing, i.e., to implement block 860. In an aspect, the memory 360 of the UE 350 in FIG. 3 may be an example of a computer-readable medium that stores computer executable instructions for one or more of the RX processor 356, the channel estimator 358, the controller/processor 359, and/or the TX processor 368 of the UE 350 to implement block 860.

At block 910, the UE may determine whether the second link quality metric is at or above a high link quality threshold. The high link quality threshold may be predetermined, determined based on a table, and/or dynamically determined to reflect that a likelihood of establishing a communication link capable of providing some guaranteed level of performance between the UE and the network node if the switch to the second BPL is made. The high link quality threshold may also take into account factors similar to those discussed above with respect to the marginal link quality. However, the marginal link quality threshold is below or equal to the high link quality threshold, e.g., SNRs, SINRs, and RSRPs corresponding to the high link quality threshold are higher than or equal to an SNRs, SINRs, and RSRPs corresponding to the marginal link quality threshold.

In an aspect, means to perform block 910 may include one or more of the antenna 352, the transceiver 354, the RX processor 356, the channel estimator 358, the controller/processor 359, and/or the memory 360 of the UE 350 in FIG. 3.

If the UE determines that the second link quality metric is at or above the high link quality threshold ("Y" branch from block 910), then at block 920, the UE may adjust the UL timing to correspond to a propagation delay difference, which is a difference between the first and second propagation delays. When the process reaches block 920 from block 910, this indicates that there is high confidence regarding the monitoring performed at blocks 810, 820. Hence, there can be high confidence in the determined propagation delay difference.

As indicated above in the discussion of FIGS. 7A and 7B, one of the reasons for adjusting the UL timing is so that the UL transmission from the UE on the second UE beam (e.g., after the beam switch) arrives at the network node aligned with UL transmissions from other UE's. More generally, the UL timing may be adjusted so that the UL transmission from the UE on the second UE beam arrives at the network node at the expected arrival time plus/minus some tolerance threshold. In other words, any transmission timing error between the UE transmission time and a reference timing may be kept within a timing error threshold.

When the magnitude of the propagation delay difference is relatively small, e.g., below a propagation delay difference threshold, the UE may make incremental timing adjustments to UE transmission timing, e.g., to maintain any UE timing error within the timing error threshold. However, if the propagation delay difference magnitude exceeds the propagation delay difference threshold, the UE may adjust the UL UE transmission timing via a single shot, i.e., make a one shot adjustment, based on the propagation delay difference.

In an aspect, means to perform block 920 may include one or more of the controller/processor 359, the memory 360 and/or the TX processor 368 of the UE 350 in FIG. 3.

However, if the UE determines that the second link quality metric is below the high link quality threshold ("N" branch from block 910), the UE may proceed to block 930. Note that at block 930, the second link quality metric is also at or above the marginal link quality threshold. At block 930, the UE may determine whether or not the propagation delay difference is less than the propagation delay difference threshold. The propagation delay difference threshold may be predetermined, determined based on a table, and/or dynamically determined to reflect a capability of the network node to recover from timing errors. For example, the network node may expect the UL transmission from the UE to arrive with some expected timing, but is able to decode the UL transmissions even when the actual timing differs from the expected timing. However, there can be a tolerance limit (e.g., as some percentage of cyclic prefix, number of symbols, etc.) beyond which the network node cannot properly decode the UL transmissions.

In an aspect, means to perform block 920 may include one or more of the controller/processor 359 and/or the memory 360 of the UE 350 in FIG. 3.

If the UE determines that the propagation delay difference is less than the propagation delay difference threshold, then the UE may proceed to block 920 ("Y" branch from block 930) to adjust the UL timing to correspond to the propagation delay difference as described above. Otherwise, when the propagation delay difference is equal to or greater than the propagation delay difference threshold, the UE may proceed to block 940 to adjust the UL timing to correspond to the propagation delay difference threshold.

In an aspect, means to perform block 940 may include one or more of the controller/processor 359, the memory 360 and/or the TX processor 368 of the UE 350 in FIG. 3.

While not specifically shown, it should be noted that there can be any number of link quality thresholds, each with corresponding propagation delay difference thresholds. Whether a single or a plurality of thresholds are used, such thresholding can prevent overcompensation, for example, if the computed propagation delay differences do not have a high confidence or if limiting the confidence given to a computed propagation delay is desirable, for example, in view of the second link quality metric being below the high link quality threshold.

Referring back to FIG. 8, at block 870, the UE may transmit in the UL over the second UE beam 762 using the adjusted UL timing at block 860. In an aspect, means to perform block 870 may include one or more of the antenna 352, the transceiver 354, the controller/processor 359, the memory 360 and/or the TX processor 368 of the UE 350 in FIG. 3.

At block 880, the UE may determine whether the UL timing adjustment is correct. In one aspect, the UE may determine whether or not the correct UL timing adjustment has been made by observing the network node's behavior when the UE transmits in the UL to the network node.

In 5G NR, the protocol is that when a transmitter transmits a unit of data to a receiver, the receiver responds with an acknowledgement (ACK) (if the data unit is received correctly) or a negative acknowledgement (NACK) (if the received data unit cannot be decoded). More specifically, the transmitter may transmit a plurality of data units, and the receiver may respond with NACKs for none, some or all of the plurality of data units.

For UL transmissions, the UE is the transmitter and the network node is the receiver. If the UL timing is incorrect, it is less likely that the network node will be able to decode the UL transmissions sent on the second UE beam, and will send back NACKs as a result. In the worst case, the network node may not even recognize the UL transmission, in which case, the network node would not even respond.

Therefore, the UE may determine that the correct UL timing adjustment has not been made when the UE transmits a plurality of UL data units and receives NACK responses or receives no responses within a response time period for the transmitted plurality of UL data units. Otherwise, the UE may determine that the correct UL timing adjustment has been made.

In another aspect, the UE may determine whether or not the correct UL timing adjustment has been made by observing the network node's behavior when the network node transmits the DL data to the UE. Again, in 5G NR, the protocol is that when a transmitter transmits a unit of data to a receiver but receives no response within a response time period, the transmitter retransmits the unit data.

For DL data transmissions, the UE is the receiver and the network node is the transmitter. When the UE receives a plurality of DL data units (e.g., on the first or second network beam), the UE can respond by transmitting on the second UE beam ACKs for each DL data unit received and decoded. However, if the UL timing is incorrect, is less likely that the network node will be able to recognize the ACKs sent on the second UE beam. Not recognizing the responses from the UE, the network node will retransmit the same plurality of DL data units.

Therefore, the UE may determine that the correct UL timing adjustment has not been made when the UE receives retransmissions of a plurality of DL data units from the network node for which the UE has previously responded with ACK responses over the second UE beam. Otherwise, the UE may determine that the correct UL timing adjustment has been made.

In an aspect, means to perform block 880 may include one or more of the antenna 352, the transceiver 354, the controller/processor 359, the memory 360 and/or the TX processor 368 of the UE 350 in FIG. 3.

If the UE determines that the correct UL timing adjust has not been made ("N" branch from block 880), the UE can trigger the RACH at block 890. Otherwise ("Y" branch from block 880), the UE can go back to blocks 810, 820 to monitor the BPLs. In this iteration, the second BPL becomes the first BPL since the communication between the UE and the network node is now over the second BPL.

In an aspect, means to perform block 890 may include one or more of the antenna 352, the transceiver 354, the RX processor 356, the controller/processor 359, the memory 360 and/or the TX processor 368 of the UE 350 in FIG. 3.

It should be noted that not all illustrated blocks of FIGS. 8 and 9 need to be performed, i.e., some blocks may be optional. Also, the numerical references to the blocks in FIGS. 8 and 9 should not be taken as requiring that the blocks should be performed in a certain order. Indeed, some blocks may be performed concurrently.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of a user equipment (UE), comprising:
monitoring a first beam pair link (BPL) to determine a first link quality metric and a first propagation delay of the first BPL, the UE currently in communication with a network node over the first BPL comprising a first network beam and a first UE beam, the UE receiving a first downlink (DL) reference signal from the network node over the first network beam, and the UE determining the first propagation delay by tracking a time of arrival of the first DL reference signal over the first network beam;
monitoring a second BPL to determine a second link quality metric and a second propagation delay of the second BPL, the second BPL comprising a second network beam and a second UE beam, the UE receiving a second DL reference signal from the network node over the second network beam, and the UE determining the second propagation delay by tracking a time of arrival of the second DL reference signal over the second network beam;
determining, based on signaling from the network node or autonomously by the UE, whether a beam switch should be made;
beam switching, when it is determined that the beam switch should be made, from the first BPL to the second BPL to communicate with the network node such that the UE switches uplink (UL) transmission from over the first UE beam to over the second UE beam;
transmitting, after the beam switch is made, in the UL over the second UE beam using UL timing adjusted based on the first link quality metric, the second link quality metric, the first propagation delay, or the second propagation delay, or any combination thereof;
determining, subsequent to transmitting in the UL over the second UE beam after the beam switch, whether a correct UL timing adjustment has been made; and
triggering a random access channel (RACH) procedure when it is determined that the correct UL timing adjustment has not been made,
wherein determining whether the correct UL timing adjustment has been made comprises determining that the correct UL timing adjustment has not been made when
the UE receives negative acknowledgement (NACK) responses or receives no responses for a plurality of UL data units transmitted to the network node over the second UE beam, or
the UE receives retransmissions of a plurality of DL data units from the network node for which the UE has previously responded with acknowledgement (ACK) responses over the second UE beam, or both.

2. The method of claim 1,
wherein there are a plurality of BPLs between the network node and the UE including the first and second BPLs,
wherein each BPL comprises a network beam and a UE beam, and
wherein for each BPL, a link quality metric of the BPL is determined based on signal-to-noise-ratios (SNRs) of one or more downlink signals, or signal-to-interference-and-noise-ratios (SINRs) of the one or more downlink signals, or reference signal received powers (RSRPs) of the one or more downlink signals, or any combination thereof.

3. The method of claim 1, wherein when the second link quality metric is at or above a high link quality threshold, the UL timing is adjusted, prior to transmitting in the UL over the second UE beam, to correspond to a propagation delay difference, the propagation delay difference being a difference between the first propagation delay and the second propagation delay.

4. The method of claim 3,
wherein when the propagation delay difference is less than a propagation delay difference threshold, the UL timing is adjusted, prior to transmitting in the UL over the second UE beam, so as to maintain a timing error between the UE transmission timing and a reference timing within a timing error threshold, and/or
wherein when the propagation delay difference is greater than the propagation delay difference threshold, the UL timing is adjusted, prior to transmitting in the UL over the second UE beam, via a one shot adjustment based on the propagation delay difference.

5. The method of claim 3, wherein when the second link quality metric is at or above a marginal link quality threshold and below the high link quality threshold and when the propagation delay difference is less than a propagation delay difference threshold, the UL timing is adjusted, prior to transmitting in the UL over the second UE beam, to correspond to the propagation delay difference.

6. The method of claim 3, wherein when the second link quality metric is at or above a marginal link quality threshold and below the high link quality threshold and when the propagation delay difference is equal to or greater than a propagation delay difference threshold, the UL timing is adjusted, prior to transmitting in the UL over the second UE beam, to correspond to the propagation delay difference threshold.

7. The method of claim 3, further comprising:
triggering a random access channel (RACH) procedure when the second link quality metric is below a marginal link quality threshold, the marginal link quality threshold being below or equal to the high link quality threshold.

8. The method of claim 1, wherein when the UE autonomously determines that the beam switch should be made, the network node is unaware of the beam switch performed by the UE.

9. A user equipment (UE), comprising:
a memory;
a transceiver; and
a processor coupled to the memory and the transceiver,
wherein the processor, the memory, and/or the transceiver are configured to:
monitor a first beam pair link (BPL) to determine a first link quality metric and a first propagation delay of the first BPL, the UE currently in communication with a network node over the first BPL comprising a first network beam and a first UE beam, the UE receiving a first downlink (DL) reference signal from the network node over the first network beam, and the processor determining the first propagation delay by tracking a time of arrival of the first DL reference signal over the first network beam;
monitor a second BPL to determine a second link quality metric and a second propagation delay of the second BPL, the second BPL comprising a second network beam and a second UE beam, the UE receiving a second DL reference signal from the network node over the second network beam, and the processor determining the second propagation delay by tracking a time of arrival of the second DL reference signal over the second network beam;

determine, based on signaling from the network node or autonomously, whether a beam switch should be made;

beam switch, when it is determined that the beam switch should be made, from the first BPL to the second BPL to communicate with the network node such that the UE switches uplink (UL) transmission from over the first UE beam to over the second UE beam;

transmit, after the beam switch is made, in the UL over the second UE beam using adjusted UL timing, the adjusted UL timing being adjusted based on the first link quality metric, the second link quality metric, the first propagation delay, or the second propagation delay, or any combination thereof;

determine, subsequent to transmitting in the UL over the second UE beam after the beam switch, whether a correct UL timing adjustment has been made; and trigger a random access channel (RACH) procedure when it is determined that the correct UL timing adjustment has not been made, wherein the processor, the memory, and/or the transceiver are configured to determine that the correct UL timing adjustment has not been made when
the UE receives negative acknowledgement (NACK) responses or receives no responses for a plurality of UL data units transmitted to the network node over the second UE beam, or
the UE receives retransmissions of a plurality of DL data units from the network node for which the UE has previously responded with acknowledgement (ACK) responses over the second UE beam, or both.

10. The UE of claim 9,
wherein there are a plurality of BPLs between the network node and the UE including the first and second BPLs,
wherein each BPL comprises a network beam and a UE beam, and
wherein for each BPL, the processor, the memory, and/or the transceiver are configured to determine a link quality metric of the BPL based on signal-to-noise-ratios (SNRs) of one or more downlink signals, or signal-to-interference-and-noise-ratios (SINRs) of the one or more downlink signals, or reference signal received powers (RSRPs) of the one or more downlink signals, or any combination thereof.

11. The UE of claim 9, wherein when the second link quality metric is at or above a high link quality threshold, the processor, the memory, and/or the transceiver are configured to adjust the UL timing to correspond to a propagation delay difference, the propagation delay difference being a difference between the first propagation delay and the second propagation delay.

12. The UE of claim 11,
wherein when the propagation delay difference is less than a propagation delay difference threshold, the processor, the memory, and/or the transceiver are configured to adjust, prior to transmitting in the UL over the second UE beam, the UL timing so as to maintain a timing error between the UE transmission timing and a reference timing within a timing error threshold, and/or
wherein when the propagation delay difference is greater than the propagation delay difference threshold, the processor, the memory, and/or the transceiver are configured to adjust, prior to transmitting in the UL over the second UE beam, the UL timing via a one shot adjustment based on the propagation delay difference.

13. The UE of claim 11, wherein when the second link quality metric is at or above a marginal link quality threshold and below the high link quality threshold and when the propagation delay difference is less than a propagation delay difference threshold, the processor, the memory, and/or the transceiver are configured to adjust, prior to transmitting in the UL over the second UE beam, the UL timing to correspond to the propagation delay difference.

14. The UE of claim 11, wherein when the second link quality metric is at or above a marginal link quality threshold and below the high link quality threshold and when the propagation delay difference is equal to or greater than a propagation delay difference threshold, the processor, the memory, and/or the transceiver are configured to adjust, prior to transmitting in the UL over the second UE beam, the UL timing to correspond to the propagation delay difference threshold.

15. The UE of claim 11, wherein the processor, the memory, and/or the transceiver are configured to trigger a random access channel (RACH) procedure when the second link quality metric is below a marginal link quality threshold, the marginal link quality threshold being below or equal to the high link quality threshold.

16. The UE of claim 9, wherein when the UE autonomously determines that the beam switch should be made, the network node is unaware of the beam switch performed by the UE.

17. A user equipment (UE), comprising:
means for monitoring a first beam pair link (BPL) to determine a first link quality metric and a first propagation delay of the first BPL, the UE currently in communication with a network node over the first BPL comprising a first network beam and a first UE beam, the UE receiving a first downlink (DL) reference signal from the network node over the first network beam, and the means for monitoring the first BPL determining the first propagation delay by tracking a time of arrival of the first DL reference signal over the first network beam;

means for monitoring a second BPL to determine a second link quality metric and a second propagation delay of the second BPL, the second BPL comprising a second network beam and a second UE beam, the UE receiving a second DL reference signal from the network node over the second network beam, and the means for monitoring the second BPL determining the second propagation delay by tracking a time of arrival of the second DL reference signal over the second network beam;

means for deciding, based on signaling from the network node or autonomously, whether a beam switch should be made;

means for beam switching, when the means for deciding decides that the beam switch should be made, from the first BPL to the second BPL to communicate with the network node such that the UE switches uplink (UL) transmission from over the first UE beam to over the second UE beam;

means for transmitting, after the beam switch is made, in the UL over the second UE beam using adjusted UL timing, the adjusted UL timing being adjusted based on the first link quality metric, the second link quality metric, the first propagation delay, or the second propagation delay, or any combination thereof;

means for determining, subsequent to transmitting in the UL over the second UE beam after the beam switch, whether a correct UL timing adjustment has been made; and means for triggering a random access channel (RACH) procedure when it is determined that the correct UL timing adjustment has not been made, wherein the means for determining whether the correct UL timing adjustment has been made is configured to determine that the correct UL timing adjustment has not been made when
- the UE receives negative acknowledgement (NACK) responses or receives no responses for a plurality of UL data units transmitted to the network node over the second UE beam, or
- the UE receives retransmissions of a plurality of DL data units from the network node for which the UE has previously responded with acknowledgement (ACK) responses over the second UE beam, or both.

18. The UE of claim 17,
wherein there are a plurality of BPLs between the network node and the UE including the first and second BPLs,
wherein each BPL comprises a network beam and a UE beam, and
wherein for each BPL, a link quality metric of the BPL is determined based on signal-to-noise-ratios (SNRs) of one or more downlink signals, or signal-to-interference-and-noise-ratios (SINRs) of the one or more downlink signals, or reference signal received powers (RSRPs) of the one or more downlink signals, or any combination thereof.

19. The UE of claim 17, further comprising:
means for adjusting UL timing to correspond to a propagation delay difference when the second link quality metric is at or above a high link quality threshold, the propagation delay difference being a difference between the first propagation delay and the second propagation delay,
wherein when the propagation delay difference is less than a propagation delay difference threshold, the means for adjusting adjusts, prior to transmitting in the UL over the second UE beam, the UL timing so as to maintain a timing error between the UE transmission timing and a reference timing within a timing error threshold, and/or
wherein when the propagation delay difference is greater than the propagation delay difference threshold, the means for adjusting adjusts, prior to transmitting in the UL over the second UE beam, the UL timing via a one shot adjustment based on the propagation delay difference.

20. The UE of claim 19, wherein the means for adjusting adjusts, prior to transmitting in the UL over the second UE beam, the UL timing to correspond to the propagation delay difference when the second link quality metric is at or above a marginal link quality threshold and below the high link quality threshold and when the propagation delay difference is less than a propagation delay difference threshold.

21. The UE of claim 19, wherein the means for adjusting adjusts, prior to transmitting in the UL over the second UE beam, the UL timing to correspond to a propagation delay difference threshold when the second link quality metric is at or above a marginal link quality threshold and below the high link quality threshold and when the propagation delay difference is equal to or greater than the propagation delay difference threshold.

22. A non-transitory computer-readable medium storing computer-executable instructions for a user equipment (UE), the computer-executable instructions comprising:
one or more instructions instructing the UE to monitor a first beam pair link (BPL) to determine a first link quality metric and a first propagation delay of the first BPL, the UE currently in communication with a network node over the first BPL comprising a first network beam and a first UE beam, the UE receiving a first downlink (DL) reference signal from the network node over the first network beam, and the instructions instructing the UE to determine the first propagation delay by tracking a time of arrival of the first DL reference signal over the first network beam;
one or more instructions instructing the UE to monitor a second BPL to determine a second link quality metric and a second propagation delay of the second BPL, the second BPL comprising a second network beam and a second UE beam, the UE receiving a second DL reference signal from the network node over the second network beam, and the instructions instructing the UE to determine the second propagation delay by tracking a time of arrival of the second DL reference signal over the second network beam;
one or more instructions instructing the UE to determine, based on signaling from the network node or autonomously, whether a beam switch should be made;
one or more instructions instructing the UE to beam switch, when it is determined that the beam switch should be made, from the first BPL to the second BPL to communicate with the network node such that the UE switches uplink (UL) transmission from over the first UE beam to over the second UE beam;
one or more instructions instructing the UE to transmit, after the beam switch is made, in the UL over the second UE beam using adjusted UL timing, the adjusted UL timing being adjusted based on the first link quality metric, the second link quality metric, the first propagation delay, or the second propagation delay, or any combination thereof
one or more instructions instructing the UE to determine, subsequent to transmitting in the UL over the second UE beam after the beam switch, whether a correct UL timing adjustment has been made; and
one or more instructions instructing the UE to trigger a random access channel (RACH) procedure when it is determined that the correct UL timing adjustment has not been made,
wherein the one or more instructions instructing the UE to determine whether the correct UL timing adjustment has been made comprise one or more instructions instructing the UE to determine that the correct UL timing adjustment has not been made when
- the UE receives negative acknowledgement (NACK) responses or receives no responses for a plurality of UL data units transmitted to the network node over the second UE beam, or
- the UE receives retransmissions of a plurality of DL data units from the network node for which the UE has previously responded with acknowledgement (ACK) responses over the second UE beam, or both.

23. The non-transitory computer-readable medium of claim 22,
wherein there are a plurality of BPLs between the network node and the UE including the first and second BPLs, wherein each BPL comprises a network beam and a UE beam, and wherein for each BPL, a link quality metric of the BPL is determined based on signal-to-noise-ratios (SNRs) of one or more downlink signals, or signal-to-interference-and-noise-ratios (SINRs) of the one or more downlink signals, or reference signal received powers (RSRPs) of the one or more downlink signals, or any combination thereof.

24. The non-transitory computer-readable medium of claim 22, wherein when the second link quality metric is at or above a high link quality threshold, the instructions cause the UE to adjust, prior to transmitting in the UL over the second UE beam, the UL timing to correspond to a propagation delay difference, the propagation delay difference being a difference between the first propagation delay and the second propagation delay, wherein when the propagation delay difference is less than a propagation delay difference threshold, the one or more instructions cause the UE to adjust, prior to transmitting in the UL over the second UE beam, the UL timing so as to maintain a timing error between the UE transmission timing and a reference timing within a timing error threshold, and/or wherein when the propagation delay difference is greater than the propagation delay difference threshold, the one or more instructions cause the UE to adjust, prior to transmitting in the UL over the second UE beam, the UL timing via a one shot adjustment based on the propagation delay difference.

25. The non-transitory computer-readable medium of claim 24, wherein when the second link quality metric is at or above a marginal link quality threshold and below the high link quality threshold and when the propagation delay difference is less than a propagation delay difference threshold, the one or more instructions cause the UE to adjust, prior to transmitting in the UL over the second UE beam, the UL timing to correspond to the propagation delay difference.

26. The non-transitory computer-readable medium of claim 24, wherein when the second link quality metric is at or above a marginal link quality threshold and below the high link quality threshold and when the propagation delay difference is equal to or greater than a propagation delay difference threshold, the one or more instructions cause the UE to adjust, prior to transmitting in the UL over the second UE beam, the UL timing to correspond to the propagation delay difference threshold.

* * * * *